United States Patent [19]

Weyrich et al.

[11] Patent Number: 5,454,411
[45] Date of Patent: Oct. 3, 1995

[54] TREAD PROFILE FOR WINTER TIRES

[75] Inventors: Frank Weyrich, Bad König; Otto Sallein, Breuberg; Gopal Banerjee, Höchst/Odenwald, all of Germany

[73] Assignee: Pirelli Reifenwerke GmbH, Hoechst/Odenwald, Germany

[21] Appl. No.: 204,538

[22] Filed: Mar. 2, 1994

[30] Foreign Application Priority Data

Mar. 2, 1993 [DE] Germany .......................... 43 06 483.3

[51] Int. Cl.⁶ ................................................. B60C 11/11
[52] U.S. Cl. .................................. 152/209 D; 152/209 R; D12/147; D12/151
[58] Field of Search ............................ 152/209 R, 209 A, 152/209 D; D12/147, 151

[56] References Cited

U.S. PATENT DOCUMENTS

| | | | |
|---|---|---|---|
| 4,606,389 | 8/1986 | Haas | 152/209 R |
| 4,690,189 | 9/1987 | Bradisse et al. | 152/209 R |
| 4,779,656 | 10/1988 | Graas | 152/209 R |
| 4,913,208 | 4/1990 | Anderson et al. | 152/209 R |

*Primary Examiner*—Michael W. Ball
*Assistant Examiner*—Francis J. Lorin
*Attorney, Agent, or Firm*—Herbert L. Lerner; Laurence A. Greenberg

[57] ABSTRACT

A tread profile for winter tires of motor vehicles, in particular vehicles of the pickup truck or light truck class, includes at least four circumferentially extending longitudinal grooves and transverse grooves demarcating profile blocks. The transverse grooves extend helically with an approximately Z-shaped kink in the middle of the width of the tread. The longitudinal grooves have a given groove width and have individual segments between two of the transverse grooves. Each of the segments are staggered alternatingly to the left and to the right relative to one another by at least one-half of the given groove width.

3 Claims, 1 Drawing Sheet

TREAD PROFILE FOR WINTER TIRES

BACKGROUND OF THE INVENTION

FIELD OF THE INVENTION

The invention relates to a tread profile for winter or snow tires of motor vehicles, particularly of the pickup truck or light truck class, having at least two circumferentially extending grooves and transverse grooves for demarcating profile blocks.

In order to optimize the winter properties of tires, the corresponding tread profile must have as many transverse grooves and edges as possible, which lend the profile the flexibility to produce the requisite necessary traction.

However, the flexibility of the profile has an adverse effect on driving stability. Such driving stability is attained above all by means of large blocks, yet that is at the sacrifice of the requisite winter properties. On the other hand, a large number of long edges promotes lateral stability and at the same time provides positive influence on the profile flexibility.

SUMMARY OF THE INVENTION

It is accordingly an object of the invention to provide a tread profile for winter tires, which overcomes the hereinafore-mentioned disadvantages of the heretofore-known devices of this general type, which not only has good winter properties but also has very good four-season properties with high driving stability and which is intended to serve in particular for high-speed, heavy vehicles of the pickup truck or light truck class.

With the foregoing and other objects in view there is provided, in accordance with the invention, a tread profile for winter tires of motor vehicles, in particular vehicles of the pickup truck or light truck class, comprising at least four circumferentially extending longitudinal grooves and transverse grooves demarcating profile blocks; the transverse grooves extending helically with an approximately Z-shaped kink in the middle of the width of the tread; and the longitudinal grooves having a given groove width and having individual segments between two of the transverse grooves, each of the segments being staggered alternatingly to the left and to the right relative to one another by at least one-half of the given groove width.

The profile has numerous longitudinal grooves, which are especially advantageous for accurate tracking, lateral stability, aquaplaning, wear performance and noise.

In accordance with another feature of the invention, the two middle longitudinal grooves are approximately twice as wide as the two outer longitudinal grooves.

In accordance with a further feature of the invention, there is provided, in the middle region of the tread width, one further Z-shaped groove extending circumferentially between adjacent kink points of two grooves.

In accordance with an added feature of the invention, the Z-shaped groove has two groove segments, initially branching off circumferentially from the transverse groove kink points, and one connecting groove diagonally intersecting the center line.

In accordance with an additional feature of the invention, as a result of this Z-shaped middle groove between each two transverse grooves and the two inner circumferential grooves, two middle blocks of the same shape, located mirror-symmetrically with respect to the connecting groove, are demarcated.

In accordance with yet another feature of the invention, the circumferentially extending groove segments of the Z-shaped groove, with interruptions through the middle blocks, form two further circumferential grooves.

In accordance with a concomitant feature of the invention, the Z-shaped kinks and the complementary Z-grooves form a water shedding or removal system.

Other features which are considered as characteristic for the invention are set forth in the appended claims.

Although the invention is illustrated and described herein as embodied in a tread profile for winter tires, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
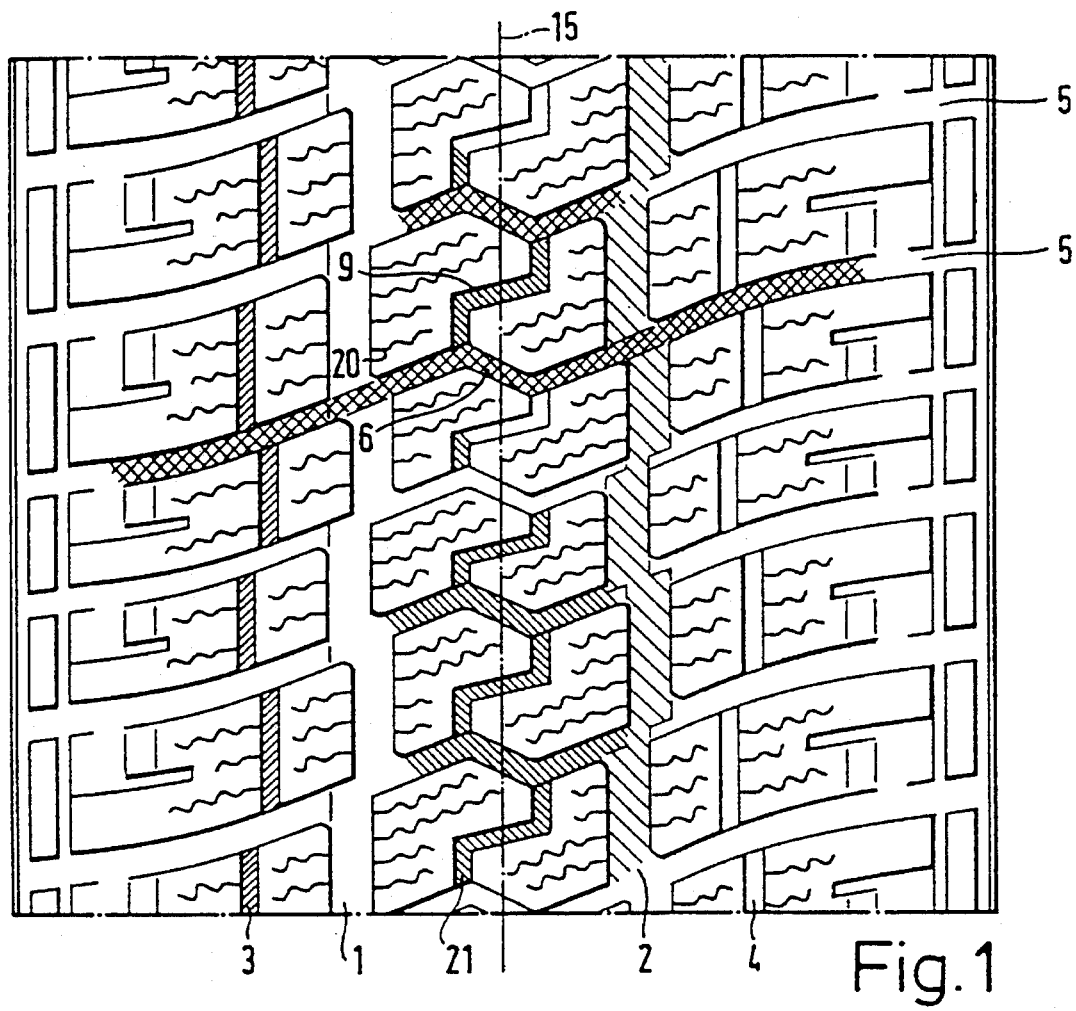
FIG. 1 is a diagrammatic, plan view of a tread profile over a certain circumferential region of a tire.

Referring now to the figures of the drawing in detail and first, particularly, to FIG. 1 thereof, it is seen from an initial glance that a tread profile is distinguished by four longitudinal grooves, specifically two middle somewhat broader longitudinal grooves 1 and 2, and two outer somewhat narrower longitudinal grooves 3 and 4.

These longitudinal grooves 1, 2 and 3, 4 are interrupted by helically extending transverse grooves 5, having two lateral branches which are offset somewhat from one another and joined in the middle by a Z-shaped kink 6. The longitudinal grooves 1, 2, 3, 4 and the transverse grooves 5 demarcate profile blocks.

As can also be seen from FIG. 1, each of the two inner longitudinal grooves 1 and 2 between each two transverse grooves 5 have segments which are offset to the left and to the right in alternation by one-half of the width of the groove 1 or 2. In the same sense, each of the two outer narrower longitudinal grooves 3 and 4 between each two transverse grooves 5 have segments which are also staggered alternatingly to the left and to the right, but by one full width of the groove 3 or 4.

This staggering makes a very much greater width conceivably available for each individual longitudinal groove, and that promotes accurate tracking, lateral stability, and improved aquaplaning performance.

Figure 2:
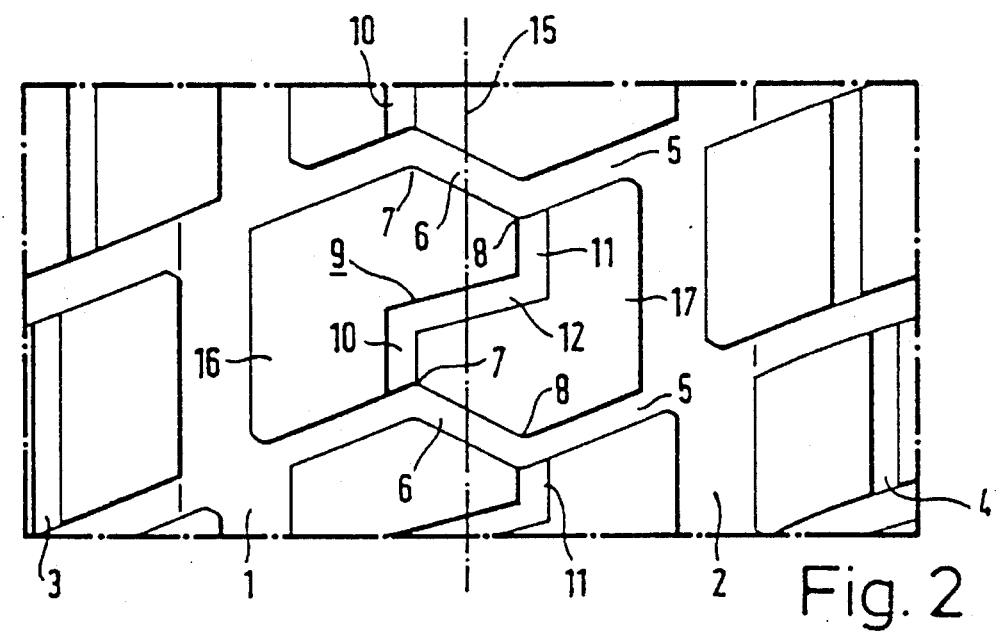
FIG. 2 is an enlarged, plan view of a middle region of the profile.

As can be best seen from the enlarged fragmentary view of FIG. 2, a complementary Z-shaped groove 9 extends practically circumferentially and joins each two transverse grooves 5. The Z-shaped grooves 9 extend between each two approximately radially extending Z-shaped kinks 6 of the transverse grooves 5. Specifically, in each case the Z-shaped grooves 9 extend between closest-together kink points 7 of one transverse groove and closest-together kink points 8 of the next transverse groove. This Z-shaped groove 9 has groove segments 10 and 11 which initially branch off circumferentially from the transverse groove kink points 7 and 8. The two segments 10 and 11 are joined together by a connecting groove 12 that intersects a center line 15 of the tread profile in the diagonal direction.

This Z-shaped longitudinal groove 9 thus demarcates or defines practically two equal-shaped larger middle blocks 16 and 17. The blocks 16 and 17 are mirror-symmetrical with respect to the connecting groove 12 and are disposed between two of the transverse grooves 5 and the adjacent longitudinal grooves 1 and 2. These middle blocks create the major portion of the excellent winter properties of the tire.

As can be seen especially from FIG. 1, these two middle blocks 16 and 17, as well as all of the other blocks, are furthermore provided with laminations 20, which optimizes the traction overall.

As can be seen especially from the lower middle region of FIG. 1, the Z-shaped kinks and grooves 6 and 9 communicate with one another longitudinally and transversely, are provided in the shaded region between the center blocks 16 and 17 and overall represent a system 21 with which requisite engagement edges for increased traction of the tire are created. This Z-groove system 21 thus also represents an optimal water shedding or removal system for the tire tread.

Finally, the two groove segments 10 and 11 of the middle Z-shaped groove 9, which extend longitudinally, produce practically two further longitudinal grooves, although they are intermittently interrupted parallel to the main grooves 1, 2 and 3, 4, respectively.

A further characteristic appearance of this tire is attained if the two outer longitudinal grooves 3 and 4 are combined with the Z-shaped middle groove 9. These grooves form a further distinguishing characteristic of this tire profile.

Overall, the result is a tread profile for fast, heavy pickup trucks or light trucks that not only has good four-season properties but which is also suitable for winter use, which produces very good starting, handling and braking values with good traction on snow and which at the same time produces a very comfortable ride with very accurate tracking and lateral stability, improved aquaplaning performance, and low noise.

We claim:

1. In a winter tire for motor vehicles having a tread, the tread having a width and the width having a middle region, a tread profile, comprising:

an imaginary center line of the tread defined in the middle region and circumferentially extending about the tire;

four circumferential grooves, said circumferential grooves being spaced apart in a lateral direction and defining two middle and two outer longitudinal grooves;

transverse grooves extending transversely to said circumferential grooves, said transverse grooves being spaced apart in a circumferential direction and demarcating profile blocks therebetween; each of said transverse grooves extending with an approximately Z-shaped kink in the middle region of the width of the tread, and each having spaced-apart kink points disposed on different sides of said center line;

substantially Z-shaped grooves connecting said kink points of mutually adjacent transverse grooves disposed on opposite sides of said center line; each of said Z-shaped grooves being formed by two groove segments initially branching off circumferentially from said kink points of said mutually adjacent transverse grooves and a connecting groove diagonally intersecting said center line;

two identically shaped middle blocks being mirror symmetrical with respect to said connecting groove of said Z-shaped grooves, said middle blocks being demarcated by said two inner circumferential grooves and by said Z-shaped middle groove between each two of said transverse grooves;

said longitudinal grooves having a given groove width and having individual segments, each of said segments being staggered alternatingly to the left and to the right relative to one another by at least one-half of said given groove width.

2. The tread profile according to claim 1, wherein said two middle longitudinal grooves are approximately twice as wide as said two outer longitudinal grooves.

3. The tread profile according to claim 1, wherein said Z-shaped kinks and said complementary Z-grooves form a water shedding system.

* * * * *